Figure 1:
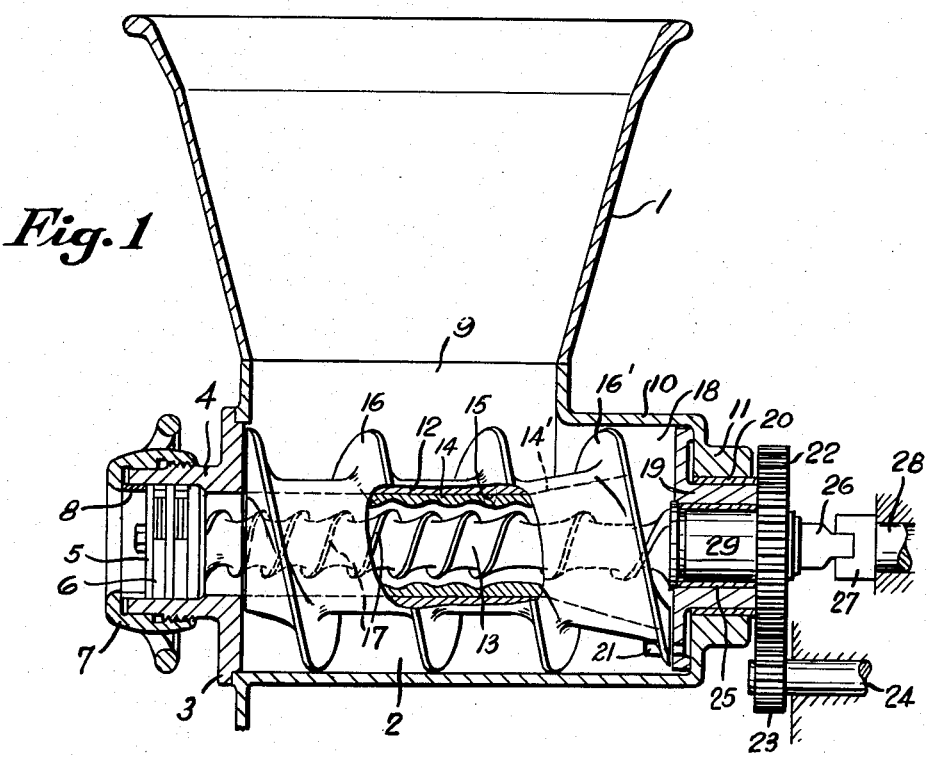

Dec. 1, 1953   P. GÜLDENRING   2,661,040
MEAT GRINDER
Filed Oct. 19, 1949

INVENTOR.
PAUL GULDENRING
BY Richards C. Faier

ATTORNEYS

Patented Dec. 1, 1953

2,661,040

UNITED STATES PATENT OFFICE 2,661,040

MEAT GRINDER

Paul Güldenring, Remscheid, Germany

Application October 19, 1949, Serial No. 127,880

9 Claims. (Cl. 146—181)

This invention relates to certain new and useful improvements in meat grinders or mincers, and it has for its objects among others, in addition to those usually sought in this class of devices, to provide an improved means for especially mincing meat, composed of a worm for forcing the meat into the mincing cutter chamber of the machine and a second worm for passing the meat from the hopper to the force-feed screw. In the current type machines of this construction the force-feed screw and the conveyor screw are arranged either in an axial line or parallel to each other. As compared with the simple type machines with only one worm such machines offer the disadvantage of an overall length with the added length of the conveyor screw or of an overall height or width with the added diameter of the conveyor screw. Another disadvantage is the unsatisfactory conveyance of the meat from the conveyor screw to the force-feed worm.

The structural embodiment of the present invention eliminates this drawback mainly due to the fact that the two worms are assembled one inside the other in that the force-feed worm is preferably housed inside the screw conveyor with peripheral slots provided in the inner jacket to prevent meat conveyed by the force-feed worm from moving back. The two worms turn in the same direction, but are designed with an opposite "hand," whereby the flights of the screw conveyor have a comparatively coarser pitch than the thread of the force-feed worm. In order to arrive at a uniform feeding of the force-feed worm with a view to eliminating a detrimental packing and heating of the meat, the screw conveyor is preferably driven by a speed reducing gear unit through a quill from the force-feed worm drive. The application of this method insures an automatic conveyance of the meat to the force-feed worm in sufficient quantities and in a most careful manner. According to the present invention a proper transfer of the meat to the force-feed worm can be secured by guiding the screw conveyor at its rear end in such a way that it almost contacts the walls of the cylindrical section of the machine body, whereby the screw conveyor ends at its last turn in such a way that in combination with said section of the machine body a filling chamber is formed for the force-feed worm. The inner jacket of the screw conveyor tapering outwardly at the end facing the filling chamber is another advantageous feature. The present invention provides a possibility of easily cleaning the machine in that the end wall of the machine body, holding the cutters and perforated discs, does not only project the screw conveyor, but is also detachable, so that after having dismantled the end wall, both worms can be removed by pulling them out altogether.

While the structural embodiment of the invention as hereinbefore disclosed is what at the present time is considered preferable, it will be evident that the same is subject to changes, variations, and modifications in details, proportions of parts, etc., without departing from the spirit of the invention or sacrificing any of its advantages. One of these modifications is, for instance, an arrangement in which the force-feed worm rotates inside a stationary guide tube or center pipe, around which the screw conveyor or flights turn. The stationary guide tube may be fitted to the removable housing of the cutter chamber, so that tube and cutter attachment can be removed together. This constructional feature simultaneously offers the advantages of a more convenient cleaning, because the force-feed worm guide forms a separate member independent of the screw conveyor.

The invention is clearly illustrated in the accompanying drawing, which, with numerals or reference marked thereon, form a part of this specification, and in which Fig. 1 is a longitudinal section of the top part of a meat grinder.

Figure 2:
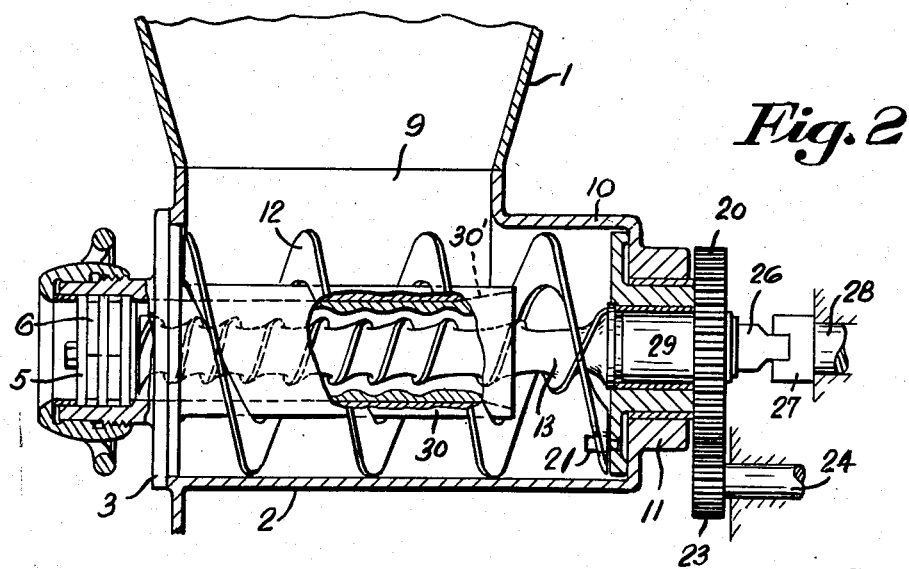

Fig. 2 shows a modified construction of this device.

Referring to the drawings, 1 designates the hopper and 2 a cylindrical member with its longitudinal axis lying in a transverse direction to the hopper, these two parts forming the body of the so-called meat grinder. To one end of the cylindrical part 2 is fitted a detachable cover 3 with tubular connection piece 4 accommodating perforated discs 5 and cutters 6, whereby cap nut 7 in threaded engagement with the connection piece holds the assembly by means of thrust collar 8. The end of cylindrical part 2 opposite cover 3 has been extended beyond the filling hole 9 of the body with which portion it forms a totally enclosed cylinder 10, the outward end of which has been drawn inwardly to serve as bearing 11 for supporting the drive of the machine.

Inside the cylindrical housing 2 of the machine body two worms 12, 13 have been arranged one inside the other. The inner solid worm 13 is totally encased by the outer tubular worm 12 and has been designed for forcing the meat in between cutters 6 of the machine. In order to prevent the meat on its way towards the cutters from moving back along the inner jacket 14 of the outer tubular worm 12, which encloses worm 13, spiral grooves 15 have been provided in the periphery of the inner jacket, which grooves extend far into the free space formed by the tubular connection piece 4 accommodating force-feed worm 13. The inner jacket 14 tapers outwardly at its rear end 14', forming together with cylindrical section 10 and the last turn 16' of outer worm 12 a filling chamber 18 for passing the material to force-feed worm 13. The outer worm 12 serves for passing the meat entering through filling hole 9 to force-feed worm 13. The screw conveyor has a coarser pitch than the threads 17 of the force-feed worm and an opposite "hand." Behind the last thread 16' the tubular wall of the screw conveyor 12 has been cut away in order to secure a free passage of the meat from chamber 18 to the force-feed worm 13.

The drive of the screw conveyor 12 is through a live flanged bushing 19 carried in bearing 11 by the aid of a cylindrical liner 20 and a coupling bolt 21 located inside the flange, which coupling bolt is fastened to the screw conveyor. To the outward end of flanged bushing 19 is mounted a drive gear 22 meshing a pinion 23 of a countershaft 24. The rear end of the force-feed screw shaped into a journal 29 is carried in flanged bushing 19 by means of an intermediate bushing 25. The outer end of worm shaft 29 is provided with flats 26 engaging a correspondingly shaped recess in a coupling flange 27 of drive shaft 28.

A variation in the design of the device, as shown in Fig. 2, comprises a housing with two worms 13 and 12 assembled one inside the other, whereby the inner worm 13 forces the meat against perforated discs 5 and cutters 6, whereas the outer worm 12 serves for passing the material entering from the hopper 1 or through the opening 9 of the housing 2 to worm 13. According to this design the force-feed screw 13 revolves inside a cylindrical jacket 30 fitted inside the housing 2 of the body, which jacket serves for guiding the meat or other substance pushed forward by said worm. A screw conveyor 12 revolving around said jacket is of the sectional flight type similar in shape to the so-called ribbon conveyor. The cylindrical guide jacket 30 extends from the removable cover 3 of the machine body 2 to somewhat beyond the rear edge of the filling hole 9, so that the rear portion of the force-feed worm inside the cylindrical rear section 10 of the housing 2 is non-jacketed, thus offering free access to the material fed by worm 12. The inside periphery of the jacket 30 is provided with spiral grooves 15 and its rearward end tapered outwardly, as shown at 30'. The jacket is rigidly mounted to cover 3, with which it preferably forms one integral part.

The following is an outline of how the machine works:

The meat filled into the hopper 1 enters through inlet 9 and passes to the screw conveyor 12, which conveys it into chamber 18 from where it reaches the force-feed worm 13. Both worms rotate in a coordinate sense, i. e. in the same direction. Worm 13 forces the meat in between the perforated discs 5 and cutters 6, where it is minced. Due to the larger threads or flights 16 and their coarser pitch the screw conveyor can handle considerably more material than the force-feed worm, so that the screw conveyor need only be revolved at a very low speed for feeding the volume of meat required by the force-feed screw. A constructional feature of the machine is its great ease of cleaning inasmuch as after having removed the detachable cover 3, both worms 12, 13 can be pulled out of the housing 2.

From the foregoing it will be seen that I have devised a novel, efficient, and reliable form of meat grinder or mincer and that I do not intend to restrict myself to the particular construction hereinbefore set forth, but reserve the right to make such changes, variations, and modifications as come properly within the scope of the protection prayed. In particular, I do not wish to restrict the device to the grinding or mincing of meat but extend its usefulness to the satisfactory handling of other materials as well.

What I claim as new is:

1. A meat grinder, comprising, in combination with a casing, a hopper on top of said casing, and means connected to one side of said casing and constituting a cutter chamber communicating with the interior of said casing, a worm located within the interior of said casing and having threads formed to convey meat and the like from a space adjacent said hopper to a section located within the interior of said casing opposite said cutter chamber, and another worm located within the first-mentioned worm and extending from said section to said cutter chamber and having threads formed to convey the meat from said section to said cutter chamber.

2. A meat grinder, comprising, in combination with a casing, a hopper on top of said casing, and means connected to one side of said casing and constituting a cutter chamber communicating with the interior of said casing, a screw conveyor located within the interior of said casing and having threads formed to convey meat and the like from a space adjacent said hopper to a section located within the interior of said casing opposite said cutter chamber, and a force-feed worm located within said screw conveyor and extending from said section to said cutter chamber and having threads formed to convey the meat from said section to said cutter chamber, said screw conveyor having spiral grooves formed in the interior thereof and cooperating with the threads of the worm.

3. A meat grinder, comprising, in combination with a casing, a hopper on top of said casing, and means connected to one side of said casing and constituting a cutter chamber communicating with the interior of said casing, a screw conveyor located within the interior of said casing and having threads formed to convey meat and the like from a space adjacent said hopper to a section located within the interior of said casing opposite said cutter chamber, a force-feed worm located within said screw conveyor and extending from said section to said cutter chamber and having threads formed to convey the meat from said section to said cutter chamber, said screw conveyor having spiral grooves formed in the interior thereof and cooperating with the threads of the worm, the threads of the screw conveyor and the force-feed worm being inclined in opposite directions, the threads of the screw conveyor being larger and having a greater pitch than the threads of the force-feed worm, and means connected with the screw conveyor and the force-feed worm for rotating them in the same direction and for rotating the screw conveyor at substantially lesser speed than the force-feed worm.

4. A meat grinder, comprising, in combination with a casing, a hopper on top of said casing, and means connected to one side of said casing and constituting a cutter chamber communicating with the interior of said casing, a screw conveyor located within the interior of said casing and having threads formed to convey meat and the like from a space adjacent said hopper to a section located within the interior of said casing opposite said cutter chamber, a force-feed worm located within said screw conveyor and extending from said section to said cutter chamber and having threads formed to convey the meat from said section to said cutter chamber, said screw conveyor having spiral grooves formed in the interior thereof and cooperating with the threads of the worm, the threads of the screw conveyor and the force-feed worm being inclined in opposite directions, the threads of the screw conveyor being larger and having a greater pitch than the threads of the force-feed worm, a flanged bushing carried by said casing, a coupling bolt operatively connecting said screw conveyor with said flanged bushing, a shaft journal carried by said bushing and operatively connected with said worm, a drive shaft, means operatively connecting said shaft journal with said drive shaft, and a drive connected with said bushing.

5. A meat grinder, comprising, in combination with a casing, a hopper on top of said casing, and means connected to one side of said casing and constituting a cutter chamber communicating with the interior of said casing, a screw conveyor located within the interior of said casing and having threads formed to convey meat and the like from a space adjacent said hopper to a section located within the interior of said casing opposite said cutter chamber, a force-feed worm located within said screw conveyor and extending from said section to said cutter chamber and having threads formed to convey the meat from said section to said cutter chamber, said screw conveyor having spiral grooves formed in the interior thereof and cooperating with the threads of the worm, the threads of the screw conveyor and the force-feed worm being inclined in opposite directions, the threads of the screw conveyor being larger and having a greater pitch than the threads of the force-feed worm, the rear end of said screw conveyor being located in an enclosed portion of said casing and terminating at a distance from said casing to form said section within the casing.

6. A meat grinder, comprising, in combination with a casing, a hopper on top of said casing, and means connected to one side of said casing and constituting a cutter chamber communicating with the interior of said casing, a screw conveyor located within the interior of said casing and having threads formed to convey meat and the like from a space adjacent said hopper to a section located within the interior of said casing opposite said cutter chamber, a force-feed worm located within said screw conveyor and extending from said section to said cutter chamber and having threads formed to convey the meat from said section to said cutter chamber, said screw conveyor having spiral grooves formed in the interior thereof and cooperating with the threads of the worm, the threads of the screw conveyor and the force-feed worm being inclined in opposite directions, the threads of the screw conveyor being larger and having a greater pitch than the threads of the force-feed worm, said screw conveyor comprising an inner jacket having a tapered rear end located at a distance from said casing to form said section within the casing.

7. A meat grinder, comprising, in combination, a casing, a hopper on top of said casing, a member detachably connected to one side of said casing and constituting a cutter chamber communicating with the interior of said casing, a screw conveyor located within the interior of said casing and having threads formed to convey meat and the like from a space adjacent said hopper to a section located within the interior of said casing opposite said cutter chamber, said cutter chamber having a width which is substantially equal to the diameter of said screw conveyor, a force-feed worm located within said screw conveyor and extending from said section to said cutter chamber and having threads formed to convey the meat from said section to said cutter chamber, said screw conveyor having spiral grooves formed in the interior thereof and cooperating with the threads of the worm, the threads of the screw conveyor and the force-feed worm being inclined in opposite directions, the threads of the screw conveyor being larger and having a greater pitch than the threads of the force-feed worm, said screw conveyor comprising an inner jacket having a tapered rear end located at a distance from said casing to form said section within the casing.

8. A meat grinder, comprising, in combination with a casing, a hopper on top of said casing, and means connected to one side of said casing and constituting a cutter chamber communicating with the interior of said casing, a force-feed worm located within said casing, a stationary jacket enclosing said force-feed worm, a ribbon-shaped screw conveyor located around said jacket and having threads formed to convey meat and the like from a space adjacent said hopper to a section located within the interior of said casing opposite said cutter chamber, said force-feed worm extending from said section to said cutter chamber and having threads formed to convey the meat from said section to said cutter chamber, said screw conveyor having spiral grooves formed in the interior thereof and cooperating with the threads of the worm, the threads of the screw conveyor and the force-feed worm being inclined in opposite directions, the threads of the screw conveyor being larger and having a greater pitch than the threads of the force-feed worm, said screw conveyor comprising an inner jacket having a tapered rear end located at a distance from said casing to form said section within the casing.

9. A meat grinder, comprising, in combination, a casing, a hopper on top of said casing, a member detachably connected to one side of said casing and constituting a cutter chamber communicating with the interior of sad casing, a force-feed worm located within said casing, a stationary jacket enclosing said force-feed worm and firmly connected with said detachable member, a ribbon-shaped screw conveyor located around said jacket and having threads formed to convey meat and the like from a space adjacent said hopper to a section located within the interior of said casing opposite said cutter chamber, said force-feed worm extending from said section to said cutter chamber and having threads formed to convey the meat from said section to said cutter chamber, said screw conveyor having spiral grooves formed in the interior thereof and cooperating with the threads of the worm, the threads of the screw conveyor and the force-feed worm being inclined in opposite directions, the threads of the screw conveyor being larger and having a greater pitch than the threads of the force-feed worm, said screw conveyor comprising an inner jacket having a tapered rear end located at a distance from said casing to form said section within the casing.

PAUL GÜLDENRING.

References Cited in the file of this patent

UNITED STATES PATENTS

| Number | Name | Date |
|---|---|---|
| 612,181 | Spurrier | Oct. 11, 1898 |
| 1,290,734 | Goodhue | Jan. 7, 1919 |
| 1,825,261 | Burns et al. | Sept. 29, 1931 |
| 2,126,029 | Parker | Aug. 9, 1938 |

FOREIGN PATENTS

| Number | Country | Date |
|---|---|---|
| 2,086 | Denmark | Apr. 1899 |
| 214,927 | Germany | Oct. 21, 1909 |
| 625,719 | Germany | Feb. 14, 1936 |
| 676,606 | Germany | June 7, 1939 |